Jan. 18, 1938.          R. W. STEVENSON          2,105,759
                        REDUCING APPARATUS
                     Filed Dec. 19, 1933          3 Sheets-Sheet 1

INVENTOR:
Robert W. Stevenson,
BY
Chas. M. Nissen,
ATT'Y.

Jan. 18, 1938.   R. W. STEVENSON   2,105,759
REDUCING APPARATUS
Filed Dec. 19, 1933   3 Sheets-Sheet 2

INVENTOR:
Robert W. Stevenson,
BY
Chas. M. Nissen,
ATTY.

Patented Jan. 18, 1938

2,105,759

UNITED STATES PATENT OFFICE 2,105,759

REDUCING APPARATUS

Robert W. Stevenson, Columbus, Ohio, assignor to The Jeffrey Manufacturing Company, a corporation of Ohio Application December 19, 1933, Serial No. 703,112

10 Claims. (Cl. 83—11)

To most municipalities the disposal of garbage is a troublesome and expensive problem, and methods of disposal in various localities differ widely. Incineration, dumping in a fill, a stream, or at sea, disposal by sale to farmers, or feeding to hogs, all possess unsatisfactory features.

It is the general practice at the present time in large cities to collect garbage and convey it to an incinerating plant where it is burned. The incinerating process is a costly one requiring a great deal of labor and the consumption of a large amount of fuel. It is very objectionable in that an incinerating plant gives off disagreeable odors and is a nuisance to the neighborhood in which it is located.

The present invention provides a machine for disposal of green garbage with minimum effort and expense, the machine being provided with grinding and reducing mechanism which grinds the garbage to a pulp so finely divided that the particles settle in water and the pulped garbage is passed on to discharge into a stream or into the local sewerage system.

Before proceeding to a detailed description of the apparatus forming the subject matter of the present invention, it is thought to be desirable to note that the apparatus of the present invention grinds and shreds the garbage, which has been collected in the usual manner and conveyed to a central point where the apparatus is located, so that the material may be ground and mixed with sufficient water to assure its conveyance without putrefaction through the ordinary sewer pipes of a city to the sewage disposal plant in the city where the sewage is disposed of in accordance with any standard practice. Where the garbage is treated in this manner, the residue from the sewage disposal plant forms a valuable fertilizing material.

As has been indicated above, one object of the invention is to provide a machine which will act upon the garbage to grind and shred the same to form a pulp so finely divided that the particles may be flushed with water and freely flow therewith, the machine also acting upon the garbage to release the interior liquid constituents thereof, thereby assuring free movement of the finely divided solid particles of garbage through the sewage.

A further object of the invention is to provide an apparatus in which the material being ground may be subjected to the action of water sprays for flushing the ground garbage through the grinder.

A still further object of the invention is to provide mechanism for collecting inorganic material commonly associated with the garbage, and which is separated during the grinding operation.

A still further object of the invention is to provide means for spraying water onto the collected inorganic material for freeing such material from finely ground particles, so that such materials may be cleanly recovered, the wash water freely draining into a sluiceway or into the sewerage system.

Another object of the invention is the provision of an improved method of disposing of garbage by reducing it to fine particles by mechanical means and while passing the finely divided garbage in a sewerage system flushing such garbage with sufficient water to assure free flow of the mixture into such sewerage system to prevent putrefaction therein with its attendant gases and offensive odors.

Other objects of the invention will appear hereinafter, the novel features and combinations being set forth in the appended claims.

The invention is exemplified in the combination and arrangement of parts shown in the accompanying drawings and described in the following specification, and it is more particularly pointed out in the appended claims.

Figures 1, 3:
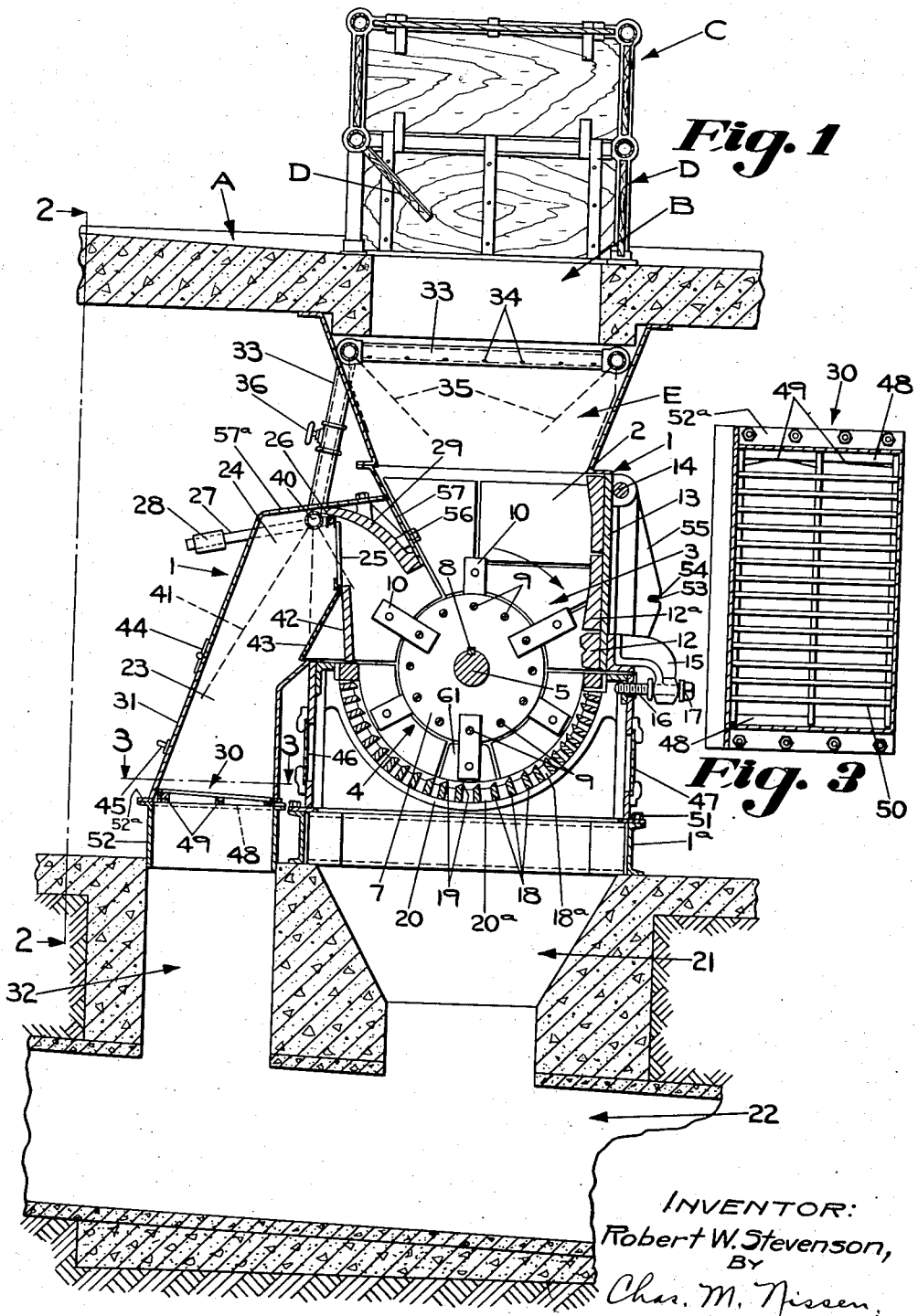
Fig. 1 represents a sectional elevation of a green garbage grinder constructed in accordance with the present invention, the view being taken on the line 1—1 of Fig. 5, looking in the direction of the arrows.
Fig. 3 is a plan view on the line 3—3 of Fig. 1, looking in the direction of the arrows, and showing the screen used for retaining the irreducible materials collected in the pocket provided therefor.

While the specific adaptation of the invention to be described is a machine for grinding garbage, it will be understood that the apparatus may be employed with possibly only slight changes in detail, which will be apparent, for any grinding operation; and it will be understood also that the machine need not be used in connection with a sewerage system, even when used as a garbage grinder, as it may be installed over any kind of a sluiceway, or on a scow for dumping the ground material directly into the sea, or in any other suitable location.

Referring more particularly to the drawings, which show an illustrative installation of the machine, and describing the machine in connection with the grinding of green garbage, the garbage is dumped on the floor A, which is illustrated as being of concrete, and which may slope towards the opening B beneath which the machine is installed. The hole B is protected by a hood C, which has doors D therein, through which the garbage is pushed after the sorters or attendants have picked out inorganic materials such as tin cans, brick bats, silverware, etc.

The garbage, after passing through the door D drops into the hopper E of the grinding machine.

The grinding machine proper comprises a casing 1 supported on channels 1a resting on a suitable floor and provided with renewable liners 2 designed to take the wear incident to the reducing operations. The reducing action takes place within the chamber 3, in which is positioned the rotor 4, the rotor being positioned on a shaft 5 operating in bearings 6. The rotor may be made up, conveniently, of a suitable number of discs 7, equi-spaced along the shaft 5, each disc being keyed to the shaft as indicated at 8 so as to rotate with the shaft. Extending through the discs 7 are rods 9, upon which rods are pivotally mounted a suitable number of swing hammers 10, which act upon the material 11, such as green garbage, to grind and shred the same. The crushing action takes place principally between the swing hammers 10 and the liners 12 and 12a of the breaker plate 13, which is hinged at 14 to the casing 1, while the shredding action takes place between the swing hammers and the shearing edges 19. The rotor 4 operates at high speed so that the material 11 is mostly supported on the top of the rotor, only a comparatively little of the material entering in a given time between the hammers 10 and the liners 12 and 12a.

It will be understood that a clearance of desired amount may be maintained continuously between the liners 12, 12a and the hammers 10, by means of adjusting mechanism comprising a bracket 15 secured to the breaker plate 13, an adjusting screw 16 being mounted in the bracket 15 and operating in the casing 1; whereby, upon adjusting the screw 16, through manipulating the head 17 thereof, the breaker plate will be moved correspondingly around the hinge 14.

Beneath the rotor 4 are positioned a plurality of screen bars 18 with the edges of which, material fed between the hammers 10 and liners 12 and 12a engages, so that the material is further shredded as it is swept over these bars by the action of the hammers. The bars 18 have their edges 19 bevelled as shown to present sharpened shearing edges to the material, for facilitating the shredding action. These bars 18 are laid on arcuate ledges 20 at each end of the machine, being maintained in position by interposed spacers 18a. The ground and shredded material drops through the interstices 20a between the bars 18, and through an opening 21 communicating with a sluiceway or sewerage line 22.

At one side of the reducing chamber 3 is a deep pocket or compartment 23, separate from the reducing compartment, but communicating therewith through the opening or throat 24. The throat 24 is closed by a gate 25 freely hinged at 26 to the casing 1 and provided with an arm 27 extending exteriorly of the casing. At the end of the arm 27 there is positioned a counterweight 28 by means of which the gate 25 is maintained normally closed. Just above the gate 25 an arcuate deflector plate 29 having the shape of a segment of a cylinder, is positioned and suitably mounted in the casing 1 on the plates 57 and 57a.

The deflector plate 29 serves to deflect irreducible inorganic materials brought around by the hammers 10, such as tin cans, silverware, etc., against the gate 25 which automatically swings open under the impact and allows such materials to fall on the screen 30 at the bottom of the compartment or trap 23. The screen 30 retains such materials until they are periodically removed through a door 31. The screen 30 is positioned over an opening 32, which opens into the sluiceway or sewer line 22.

It will be seen that the grinding and shredding action exerted upon the materials in the reducing compartment 3 reduces the organic materials sufficiently fine to pass freely through the interstices 20a between the bars 18. In order to flush the interior of the apparatus and to wash the comminuted materials through the interstices 20a, pipes 33 are mounted in the hopper E, and connected with a suitable water supply. The pipes 33 are provided with a suitable number of spray openings 34 through which sprays of water 35 are directed so that the interior of the machine is continuously flushed while in operation, and ground material tending to adhere to the liners, the rotor, and screen bars is freely flushed into the sluiceway 22. Valve 36 controls the flow of water.

Figure 2:
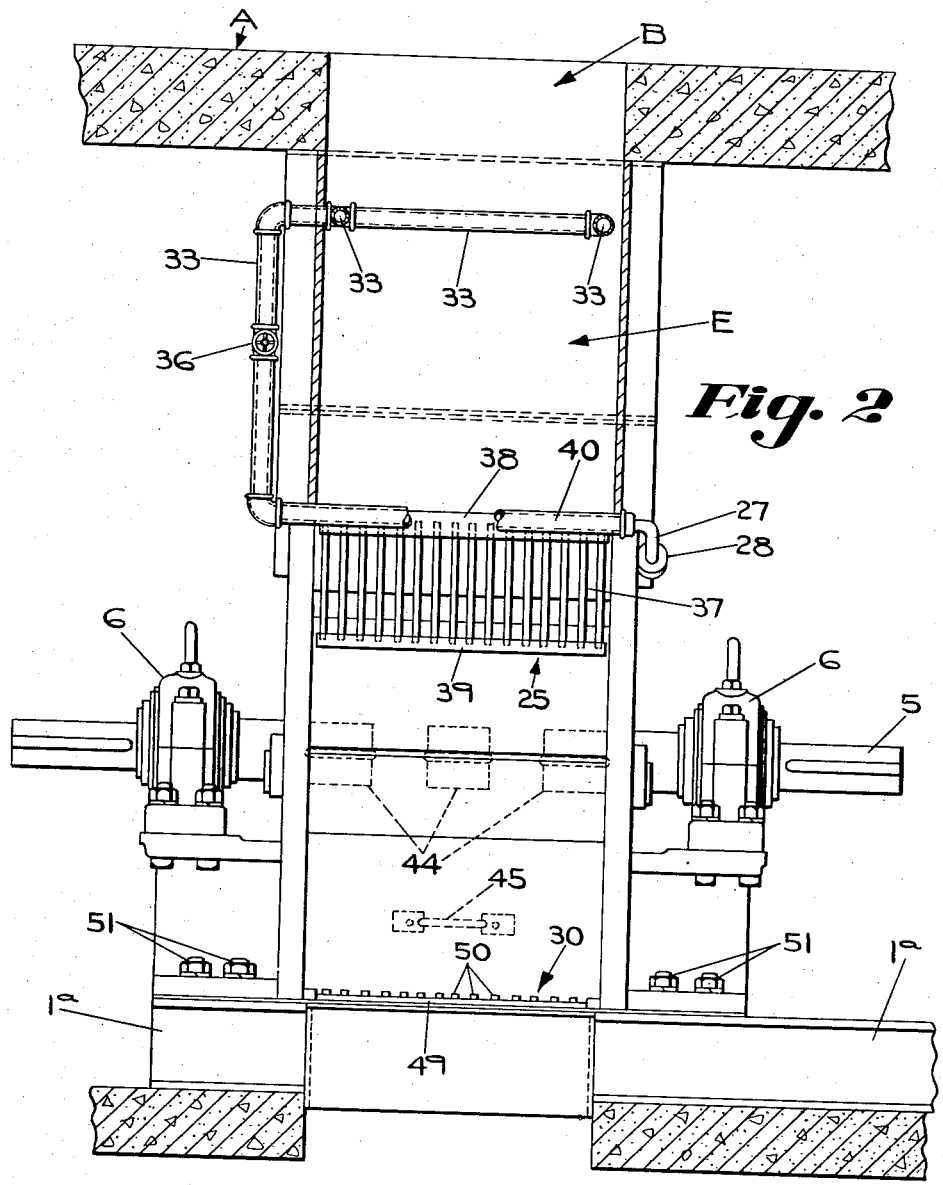
Fig. 2 is an elevation, taken on the plane of the line 2—2 of Fig. 1, looking in the direction of the arrows, the cover of the casing shown in Fig. 1 being removed, the position of the hinges and operating handle of the cover being indicated in dotted lines in Fig. 2.
Figure 5:
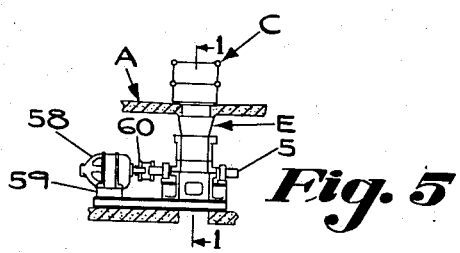
Fig. 5 is a diagrammatic view showing one form of drive mechanism for the machine.
Figure 4:
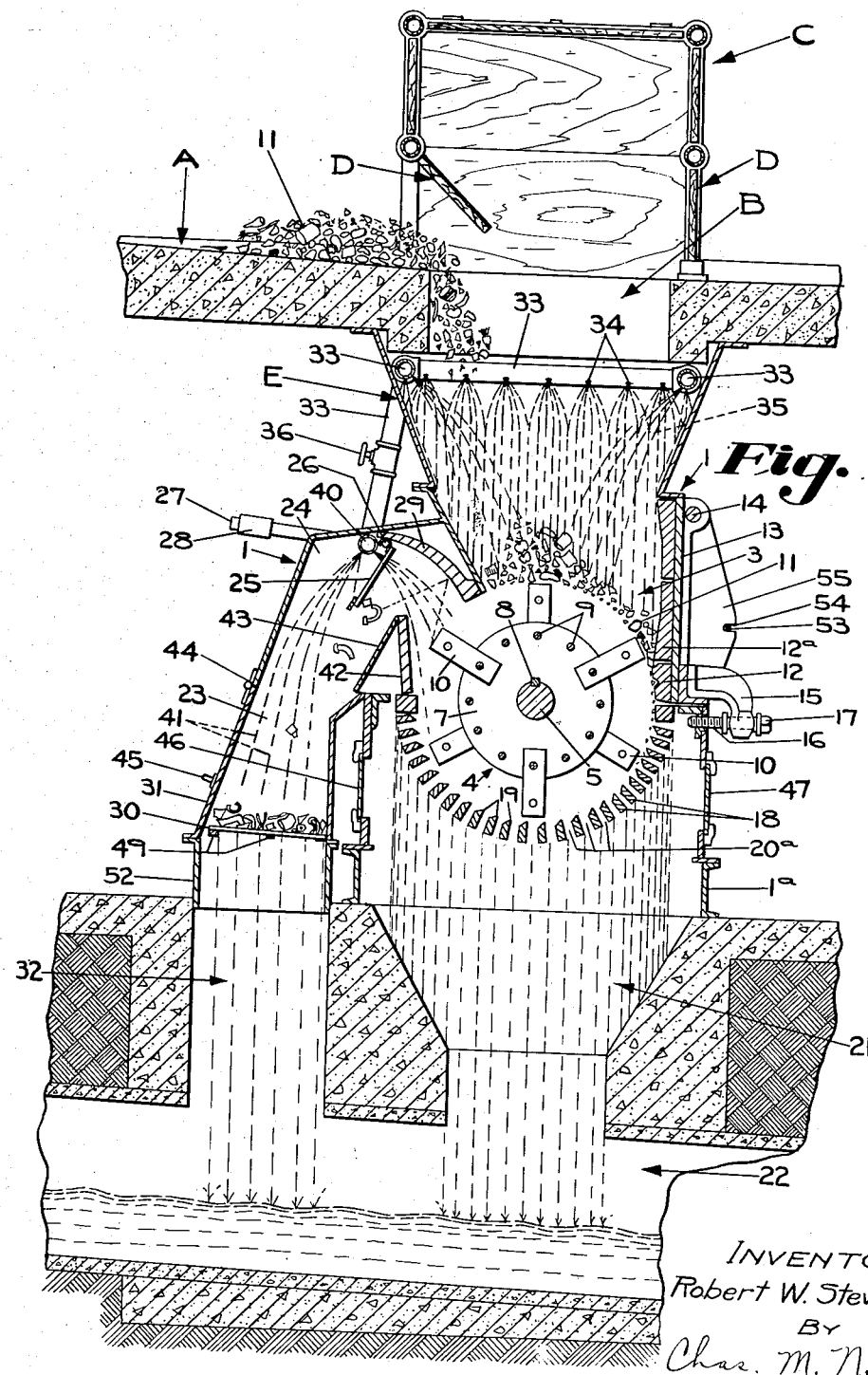
Fig. 4 is a view similar to Fig. 1, but illustrating more in perspective the action of the present apparatus.

As will be seen from Fig. 2, the gate 25 is also a screen being made up of spaced bars 37 mounted on top and bottom cross pieces 38 and 39. A certain amount of the organic material is, of course, thrown by the rotor 4 against the screen gate 25 and deflector plate 29, and will be carried over into the trap 23 where it tends to collect on the sides of the trap and on the screen 30 at the bottom thereof. Additional amounts of such material will be carried over also by the inorganic materials thrown against the gate. For the removal of this accumulated ground material in the trap 23, one or more spray pipes 40 are positioned at suitable locations in the compartment 23, so that the interior of the compartment, the screen 30, and inorganic materials collected on the screen 30 will be washed clean of ground garbage by sprays 41 issuing from the pipes 40, it being convenient and desirable also to direct some of the sprays 41 into the reducing compartment 3 through the gate 25, washing off the gate, the hammers 10, the deflector plate 29, and the inside of the vertical plate 42 against which the gate 25 abuts when closed. The baffle plate 43 positioned beneath the gate 25 on the inside thereof for guiding materials into the trap 23, is also washed off.

The flushing of the inner walls of the hopper with water not only facilitates grinding of the green garbage and the free flow of the ground material into the sewerage system, but also maintains the hopper clean and in sanitary condition when the apparatus is out of operation. In the same manner, the flushing of the curved deflector 29, the screen gate 25, the rotor including the swing-hammers 10, and the inner walls of the refuse trap 23 including the screen bottom 30 and the irreducible materials thereon, maintains the interior of the extension 1 of the casing in sanitary condition at all times. The hood C not only acts as a safeguard against the hazard to the attendants on the upper deck of stepping into the opening B and as a safeguard against material being thrown back onto the upper deck by the swing-hammers of the rotor, but also prevents the escape of disagreeable odors into the space above the upper deck A. It should also be noted that the door 31 normally closes an opening in the lower side of the outer wall of the casing 1 immediately adjacent to the screen support 30 so that when this door 31 is open, the washed ungrindable materials may be raked out in a substantially horizontal direction onto the lower deck or into a receptacle resting on the lower deck.

For access to the interior of the trap or compartment 23, the door 31 is provided. This door is hinged to casing 1 on hinges 44 and is provided with handle 45. Other doors, such as indicated at 46 and 47, for example, may be provided at suitable locations for enabling access to be had to the interior of the apparatus.

It will be noted that the screen 30 may be made up of the bars 49 of graduated thickness resting on flanges 48, cross bars 50 welded to bars 49 completing the screen, the bars 50 sloping away from the door 31 to prevent the door becoming obstructed by material collected on the screen and to allow water to drain away from the door.

The structural base 1a is an optional provision. When it is provided, the machine is bolted thereto by bolts 51, the base 1a being anchored to the floor, and the extension 52 for the trap 23 is provided, the extension 52 being fastened to flange 52a of the trap 23 for guiding into the sluiceway 22 materials flushed from the trap. When the base 1a is omitted, and the machine is anchored directly to the floor, the extension 52 also is omitted.

For securing the breaker plate 13 in position, a tie rod 53 is inserted in corresponding slots 54 of extensions 55 of the end frames of the machine.

It will be observed also that the deflector plate 29 is bolted, as indicated at 56, or otherwise suitably secured, to plates 57 and 57a, and the swinging of the gate 25 may be adjusted by varying the position of the weight 28 on the arm 27.

Shaft 5 of the rotor is driven by a motor 58 mounted on base 59, the motor being connected to shaft 5 in any suitable manner, as through a flexible coupling 60.

When the machine is being operated, green garbage is dumped on the sloping floor A from collection trucks. The sorters pick out inorganic materials such as tin cans, brick bats, silverware, etc., and then push the garbage through the hinged doors D and into the hole B in the concrete floor. The garbage drops through hopper E, which is separate from the machine proper, and thence into the machine, which reduces it to such a finely divided condition that the interior liquid constituents are released, thereby assuring free flow with the flushing water into and through the sewerage system without putrefaction, with the assurance that when such finely ground garbage reaches the sewage disposal plant it can immediately be treated therein by reason of its ability to settle in water in a quiescent state.

Water from the spray pipes 33 flushes the reduced garbage through the grinder and into the sluiceway or sewer 22. The irreducible inorganic materials missed by the sorters is thrown against the gate 25 which opens under the impact, allowing such materials to drop into the trap 23 at the back of the grinder, while water from the spray pipe 40 in the trap passes through the bar grating 30 in the bottom of the trap where such material lodges. This material is removed occasionally by raking it horizontally with a hand tool through the opening normally closed by the door 31 at the back of the machine.

A clean-out door 61 on each side of the machine may be provided for access to the lower portion of the interior of the chamber 3, and access to the upper portion of the chamber 3 may be had by releasing the breaker plate 13 and swinging the same on its hinge 14.

In some instances the gate 25 may be omitted in which event the upper edge of the plate 42 should be at sufficient height to retain organic materials in the reducing chamber while the curved deflector plate 29 acts to guide the inorganic solids into the chamber 23.

Obviously those skilled in the art may make various changes in the details and arrangement of parts without departing from the spirit and scope of the invention as defined by the claims hereto appended, and I wish therefore not to be restricted to the precise construction herein disclosed.

Having thus described and shown an embodiment of my invention, what I desire to secure by Letters Patent of the United States is:

1. Reducing apparatus for garbage comprising the combination with a casing defining a horizontally extending reducing chamber therein, of a rotary reducing unit in the said chamber mounted to rotate on a horizontal axis, means cooperating with the said unit to effect a grinding and shredding action on the garbage fed into the reducing chamber, a compartment separate from the reducing chamber but communicating therewith for collecting irreducible materials from the reducing chamber, means on the reducing unit for throwing irreducible materials into the said compartment incident to operation of the reducing unit, means interposed between the reducing chamber and the said compartment and adapted to admit the irreducible materials into the said compartment while preventing entry therein of substantial amounts of reduced materials, and means for flushing both said reducing chamber and said compartment to remove adhering particles of garbage therein and to aid said grinding action.

2. Reducing apparatus for garbage comprising the combination with a casing defining a reducing chamber therein, of a reducing unit in the said chamber mounted for rotation on a horizontal axis, means cooperating with the said unit to effect a grinding and shredding action on materials fed into the reducing chamber, a compartment separate from the reducing chamber but communicating therewith for collecting irreducible materials from the reducing chamber, means constructed and arranged to allow passage of irreducible materials from said chamber into said compartment while preventing passage of substantial amounts of reduced materials, and means for flushing the compartment to remove therefrom any reduced materials carried over from the reducing chamber.

3. Reducing apparatus for garbage comprising the combination with a casing defining a reducing chamber therein, of a reducing unit in the said chamber mounted for rotation on a horizontal axis, means cooperating with the said unit to effect a grinding and shredding action on materials fed into the reducing chamber, a compartment separate from the reducing chamber but communicating therewith for collecting irreducible materials from the reducing chamber, a screen gate interposed between the reducing chamber and the said compartment, means for swingably mounting the gate in position to hold the gate normally closed, but enabling the gate to open under impact of the irreducible materials to allow passage thereof while preventing passage of substantial amounts of reduced materials, and means for spraying the compartment and reducing chamber to remove reduced materials therefrom and to aid in said grinding action, the sprays also passing through the gate to wash off any reduced materials adhering to the gate.

4. A grinding apparatus for grinding green garbage comprising the combination with a casing defining a grinding chamber, of a rotor in the chamber, grinding and shredding means in the chamber cooperating with the rotor, a compartment separate from the grinding chamber but continuously communicating therewith for receiving ungrindable materials associated with the garbage and projected by the rotor, and means for guiding such materials into the said compartment, and means for spraying water in said chamber and said compartment to remove garbage therefrom and to aid the grinding of said garbage.

5. Reducing apparatus comprising the combination with a casing defining a reducing chamber therein, of a reducing unit in the said chamber, means cooperating with the said unit to effect a grinding and shredding action on materials fed into the reducing chamber, a compartment separate from the reducing chamber but communicating therewith for collecting irreducible materials from the reducing chamber, a door hinged at its top and opening adjacent the bottom of said compartment providing access to the interior of the said compartment, and a screen in the compartment adjacent the door and positioned above the bottom thereof and sloping away from the door for retaining irreducible materials thrown into the said compartment from the reducing chamber, but permitting ready removal thereof upon the opening of said door.

6. Reducing apparatus comprising the combination with a casing, of reducing mechanism including a rotary reducing element, mechanism affording a pocket for receiving irreducible material thrown into an entry throat by said rotary reducing element, a screen gate in said throat, and means in position to spray liquid into said throat through said gate to direct reducible material back to said rotary reducing element.

7. Reducing apparatus comprising the combination with a casing, of reducing mechanism including a rotary reducing element, mechanism affording a pocket for receiving heavy irreducible material thrown by said rotary reducing element into an entry throat at the upper end of said pocket, a screen gate in said throat, and means for spraying liquid into said throat through said gate to direct irreducible material back to said rotary reducing element and to also spray liquid onto the irreducible material thrown into said pocket.

8. Grinding apparatus for grinding green garbage comprising the combination with a casing defining a grinding chamber, of a rotor in said chamber, grinding and shredding means mounted for co-operation with said rotor, mechanism affording a compartment separate from said grinding chamber and having a throat in position to receive ungrindable materials projected into the same by said rotor, means in said throat for guiding such ungrindable materials into said separate compartment, and means at said throat for spraying liquid along said guiding means into said rotor and for spraying liquid into said separate compartment to remove adhering ground garbage from such guiding means and from the ungrindable materials received in said separate compartment.

9. Grinding apparatus for grinding green garbage comprising the combination with a casing defining a grinding chamber, of a rotor in said chamber, grinding and shredding means mounted for co-operation with said rotor, means under said grinding and shredding means for directing ground material into a sewerage system, mechanism affording a compartment separate from said grinding chamber and having a throat in position to receive ungrindable materials projected into the same by said rotor, means in said throat for guiding such ungrindable materials into said separate compartment, a screen support at the bottom of said separate compartment, means at said throat for spraying liquid along said guiding means toward said rotor and for spraying liquid into said separate compartment to remove adhering ground garbage from such grinding means and from the ungrindable materials received in said separate compartment, and means for directing into said sewerage system the liquid sprayed onto said ungrindable materials and through said screen support.

10. In a reducing machine, the combination with a casing, of a hopper for an upper inlet opening of said casing, reducing mechanism at the bottom of said casing, an extension from said casing to afford a pocket to receive irreducible materials thrown into the same by the reducing mechanism through an inlet throat communicating with the reducing mechanism at the upper end of said pocket, means at said throat for guiding irreducible materials from said reducing mechanism into said pocket, mechanism associated with the upper portion of said hopper to spray liquid over the inner walls thereof to keep the same clean and to facilitate flow of materials to said reducing mechanism, and means at said throat for spraying liquid onto said guiding means and the inner walls of said pocket to keep the same clean of reduced materials and to remove adhering reduced materials from the unreducible materials thrown into said pocket.

ROBERT W. STEVENSON.